United States Patent [19]

Jensen

[11] 4,370,239
[45] * Jan. 25, 1983

[54] BISULFITE SPONGE PROCESS

[75] Inventor: Harbo P. Jensen, Larkspur, Calif.

[73] Assignee: Chevron Research Company, San Francisco, Calif.

[*] Notice: The portion of the term of this patent subsequent to Apr. 1, 1997, has been disclaimed.

[21] Appl. No.: 216,402

[22] Filed: Dec. 15, 1980

[51] Int. Cl.³ .............................................. B01D 15/00
[52] U.S. Cl. .................................. 210/668; 210/673; 210/683; 423/519
[58] Field of Search ............... 210/668, 669, 673, 683, 210/749; 423/242, 244, 519

[56] References Cited
U.S. PATENT DOCUMENTS
4,196,175 4/1980 Jensen ................................. 423/519

OTHER PUBLICATIONS
Moeller, T., *Inorganic Chemistry*, N.Y., John Wiley & Sons, 1952, p. 537.

*Primary Examiner*—Ivars C. Cintins
*Attorney, Agent, or Firm*—D. A. Newell; S. R. LaPaglia; C. L. Hartman

[57] ABSTRACT

Sulfite ions are removed from an aqueous liquid by decreasing the pH of the liquid to convert at least a portion of the sulfite ions to bisulfite ions and contacting the liquid with a macroreticular solid compound containing carbonyl groups that can form adducts with the bisulfite ions.

6 Claims, 1 Drawing Figure

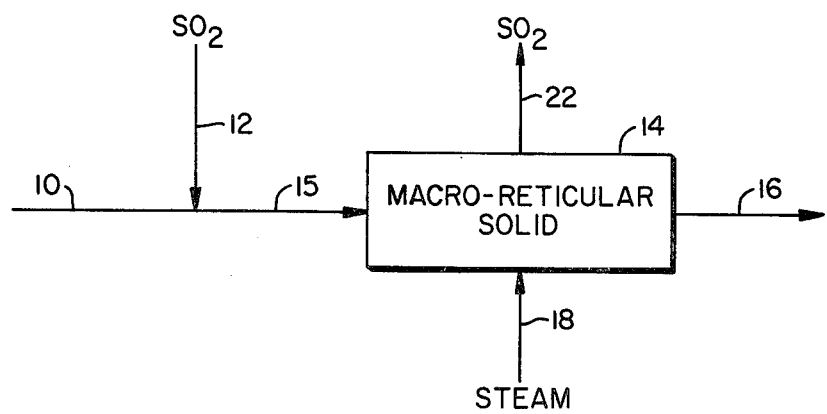

BISULFITE SPONGE PROCESS

BACKGROUND OF THE INVENTION

This invention relates to a process for reducing the sulfite salt content of an aqueous solution. More particularly, it relates to removing the sulfite ion values from an aqueous solution by substantially converting them to bisulfite by reducing the pH of the solution and contacting the solution with a macroreticular organic compound containing carbonyl functional groups which can form an adduct with the bisulfite salts.

Water soluble sulfite and bisulfite salts are known and used in the chemical industry. For example, aqueous sodium sulfite is used to scrub sulfur dioxide from flue gases, and sodium and magnesium bisulfite solutions are used to bleach wood, paper, and the like. Often, by-products and/or water streams from these uses contain residual sulfite. These residues are undesirable as they represent unused and costly materials and are environmental pollutants.

In the Wellman-Lord process, sulfur dioxide is removed from a flue-gas stream by converting the sulfur dioxide to bisulfite ion. The removal of bisulfite ion or salt from an aqueous solution is taught in U.S. Pat. No. 4,196,175 which is incorporated herein by reference. Ion exchange processes for the removal of bisulfite are also known in the art, for example, U.S. Pat. Nos. 3,879,521 and 3,896,214 which involve the exchange of bisulfite ion for ions such as hydroxide ions on ion exchange resin. The chemisorption of bisulfite salts with a compound containing adduct-forming carbonyl functional groups involves the addition of bisulfite salts to a carbonyl group as an adduct, rather than the exchange of bisulfite ion with another ion.

In the Wellman-Lord process for removing sulfur dioxide from flue gases, sulfur dioxide in the flue gas is reacted with a countercurrent flow of water and sodium sulfite, forming sodium bisulfite. As the process operates, sulfate ion tends to accumulate in the scrubbing solution, which tends to adversely affect the sulfur dioxide scrubbing properties of the Wellman-Lord system. Therefore, it is necessary periodically to purge the system to remove the sulfate ion. By the use of a macroreticular solid with carbonyl groups thereon, as disclosed in U.S. Pat. No. 4,196,175, the bisulfite values in the purge solution can be recovered; however, the sulfite values in the purge stream pass through the macroreticular solid unaffected and are lost. In a Wellman-Lord scrubbing process it is desirable to recover the sulfite as well as the bisulfite ion for economic operation.

SUMMARY OF THE INVENTION

A method is provided for removing sulfite ions from an aqueous liquid that comprises converting at least a portion of the sulfite ions to bisulfite ions by decreasing the pH of the liquid, thereby forming bisulfite, and forming adducts with the bisulfite ions with adduct-forming carbonyl functional groups contained in a macroreticular solid compound. The preferable pH range for this invention is between 2 and 7. A particularly preferred pH range is between 4 and 5. A mineral acid can be used to decrease the pH. A preferred acid is sulfurous acid formed by contacting sulfur dioxide, which has preferably been previously scrubbed from the gas, with an aqueous solution, which preferably contains sulfite ion. It is particularly preferred that the aqueous solution containing sulfite ion be the liquid that contains the sulfite ion to be removed. The macroreticular solid compound should have at least 0.1 milli-equivalents of adduct-forming carbonyl functional groups per gram of compound. The macroreticular solid compound can be regenerated by contacting steam with the resulting adduct-containing macroreticular solid.

DESCRIPTION OF THE DRAWING

The drawing shows a schematic flow diagram of one embodiment of the present invention.

DETAILED DESCRIPTION OF THE DRAWING

In a preferred embodiment, sodium sulfite and bisulfite are recovered from an aqueous solution which also contains sodium sulfate and other ions. Sulfate, in a significant concentration in a primary sulfite salt solution, can interfere with the desired use for the sulfite, for example, absorbing sulfur dioxide from flue gas. In the Wellman-Lord process a bleed stream is required to keep the sulfate concentration in an aqueous solution at or below a permissible upper level. The typical pH of this bleed stream is approximately 6.5. At this pH, a significant amount of the sulfite ion is not mono-protonated. Since the macroreticular solid can form adducts with mono-protonated sulfite, or bisulfite only, a large amount of sulfite ion can be lost from the system.

In the presence of acid, sulfite may be converted into bisulfite, which can then form adducts with the carbonyl groups on the macroreticular solid, as shown in equation 1.

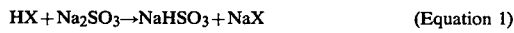

$$HX + Na_2SO_3 \rightarrow NaHSO_3 + NaX \qquad \text{(Equation 1)}$$

Any mineral acid, for example, hydrochloric or nitric, can be used. In a Wellman-Lord plant situation the preferred acid is sulfurous acid, which is easily obtained by the reaction of sulfur dioxide in water as shown in equation 2.

$$SO_2 + H_2O \rightarrow H_2SO_3 \qquad \text{(Equation 2)}$$

Sulfur dioxide can be added directly to the sulfite ion containing purge stream to form bisulfite as shown in equation 3.

$$SO_2 + H_2O + Na_2SO_3 \rightarrow 2NaHSO_3 \qquad \text{(Equation 3)}$$

This procedure is advantageous because sulfur dioxide tends to have low solubility in water. Another advantage is that there need be no separate synthesis of acid.

The pH of the solution can be easily monitored to determine the correct amount of acid to be added. The preferred pH range is between 2 and 7 and an especially preferred pH range is between 4 and 5.

Referring to the drawing, an aqueous liquid containing sulfite ion 10 is contacted with gaseous sulfur dioxide 12. The pH is controlled to optimize formation of bisulfite. The resultant liquid 15 is contacted with a macroreticular solid 14 capable of forming carbonyl adducts with bisulfite ion. By carefully maintaining the pH of the feed solution to the preferred pH ranges most of the sulfite ion present will be in the mono-protonated form, that is, bisulfite. The bisulfite then forms an adduct with the macroreticular solid 14. Any other ions present, for example, sulfate, remain in solution in the liquid 16. This liquid can be either disgarded or processed further.

Stream 18 can remove the bisulfite ion from the macroreticular solid in the form of sulfur dioxide 22. The macroreticular solid is then substantially regenerated for use, once again, as a bisulfite sponge. The regenerated macroreticular solid has approximately the same activity as the original solid.

The macroreticular solid is any porous organic polymer that has free carbonyl groups that can form carbonyl adducts with bisulfite. Preferably, the macroreticular solid will have at least 0.1 milliequivalents of adduct-forming carbonyl groups present per gram of solid.

What is claimed is:

1. A method for removing sulfite ions from an aqueous liquid comprising:
   converting at least a portion of said sulfite ions to bisulfite ions by decreasing the pH of said liquid;
   contacting said liquid with a porous organic macroreticular solid compound having at least 0.1 milliequivalents of adduct-forming carbonyl functional groups per gram of compound; thereby forming carbonyl adducts of said bisulfite ions and a residual liquid;
   withdrawing said residual liquid from contact with said macroreticular solid compound.

2. The method of claim 1 wherein sufficient acid is added to said liquid to provide a pH in the range of 2–7.

3. The method of claim 2 wherein said acid is sulfurous acid.

4. The method of claim 1 wherein the pH of said aqueous liquid is decreased by contacting sulfur dioxide directly with said liquid.

5. The method of claim 1 including regenerating said adduct—containing porous organic macroreticular solid compound by contacting said macroreticular solid with steam, thereby forming sulfur dioxide.

6. The method of claim 5 wherein sulfurous acid is formed by contacting said sulfur dioxide with water, and the resulting acid is employed to decrease the pH of said aqueous liquid.

* * * * *